G. P. WEBSTER.
SIGNAL.
APPLICATION FILED JAN. 29, 1916.
1,201,124.
Patented Oct. 10, 1916.
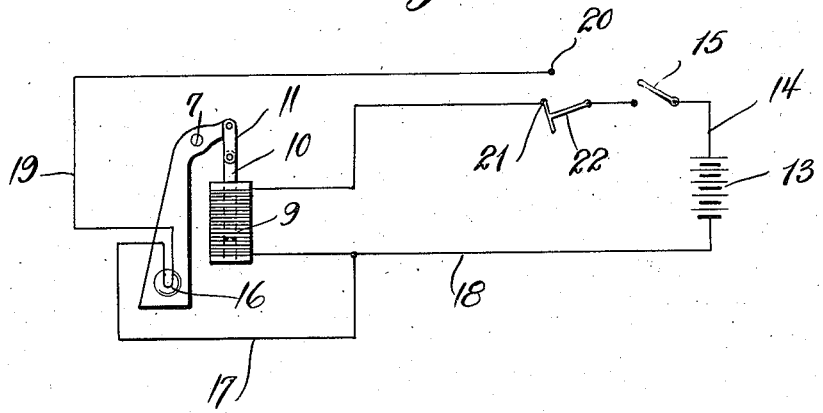
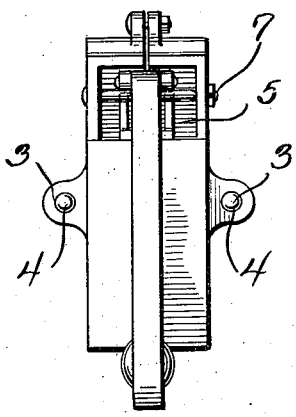
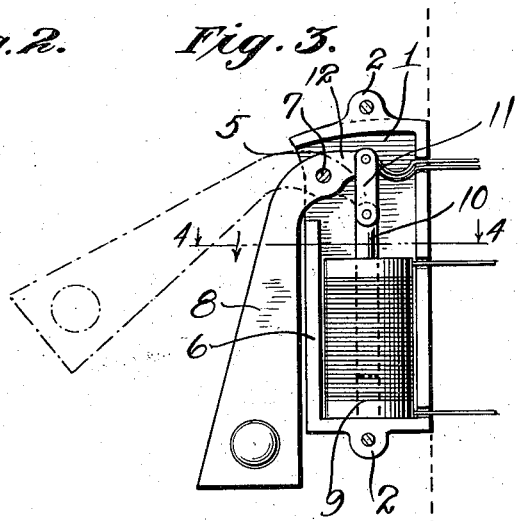
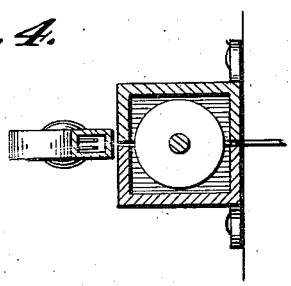
WITNESSES
W. C. Fielding
Wm. H. Mulligan
INVENTOR
George P. Webster
BY Richard B. Owen
ATTORNEY

UNITED STATES PATENT OFFICE.

GEORGE P. WEBSTER, OF EAST CLEVELAND, OHIO.

SIGNAL.

1,201,124.

Specification of Letters Patent. Patented Oct. 10, 1916.

Application filed January 29, 1916. Serial No. 75,146.

*To all whom it may concern:*

Be it known that I, GEORGE P. WEBSTER, a citizen of the United States, residing at East Cleveland, in the county of Cuyahoga and State of Ohio, have invented certain new and useful Improvements in Signals, of which the following is a specification.

This invention relates to signals for vehicles and more particularly to a signal for the rear of an automobile whereby the operator or driver of the machine may indicate to the driver of a car in the rear, the direction in which he is about to turn.

A further object of this invention is the provision of a signal for automobiles which will include an illuminated semaphore whereby the operation of the semaphore will, by reason of the light mounted thereon, indicate to following machines the direction in which the preceding machine is about to turn when traveling at night time or on a dark day.

A further object of this invention is the provision of an automobile signal whereby electrically operating means are mounted convenient to the reach of the driver of the machine for operating the signal arm to the desired position.

A further object of this invention is the provision of a signal which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which, Figure 1 is a diagrammatic view of the electric circuit by which the device is operated. Fig. 2 is an edge view. Fig. 3 is a side elevation of the device, one-half of the casing being removed. Fig. 4 is a horizontal section on the line 4—4 of Fig. 3.

The signal casing may be mounted upon an automobile in any desired manner and at any desired point but in the preferred form which is herein illustrated, it is deemed best to mount the signal on the side of the tonneau of the machine at the rear thereof, as indicated by Fig. 3 of the drawing. The casing 1 is formed of two separate parts, each part constituting a half of the casing and provided with ears 2 through which bolts are extended so that the two halves of the casing may be securely fastened together. Each half of the casing, on the rear wall thereof, has the ears 3 provided with apertures through which the fastening bolts 4 are adapted to extend for securing the casing to the side of the car. An opening 5 is provided in the wall 6 of the casing which is of a width equal to the width of the casing and the casing has mounted therein a pivot bolt 7 at its upper end and adjacent to the opening 5 upon which is mounted the semaphore 8 for swinging movement.

A solenoid 9 is mounted within the casing 1 and is constructed after the manner of devices commonly employed for imparting a reciprocating movement by means of the armature 10. A link 11 connects the armature 10 with the short end 12 of the semaphore and is adapted to pull the semaphore arm 12 so that the arm 8 will swing into position shown in dotted lines in Fig. 3 by reason of its pivot pin 7.

In the circuit, illustrated in Fig. 1, by which the device is operated, a source of current 13 is arranged in the circuit, having a wire 14 extending therefrom in which is mounted the switch 15 which, when closed, will connect the source of current to complete the circuit through the solenoid 9, whereby the solenoid will be energized to the armature 10 operating to exert a pull on the link 11 to swing the semaphore on its pivot 7.

The semaphore has mounted therein at its free end, an electric light 16 which has a wire 17 connected thereto and connecting the wire 18 of the solenoid circuit. Another wire 19 is also connected to the light and extends to a contact point 20 which will be provided on the dash board or the steer-wheel of the machine. A contact point 21 is provided in the solenoid circuit and adjacent the contact point 20 so that the switch 22 which is provided with double contact points, may be brought into contact with either one or both of the contact points 20 and 21 so that when the switch 15 is closed to complete the circuit, it will close both the light circuit and the solenoid circuits or either one of the circuits independently of the other. Thus in day time, the semaphore arm may operate by closing the switch 15 when the switch 22 is in the position shown by Fig. 1 of the drawing. At night however, when the light will be necessary for the proper working of the signal device, the switch arm 22 will be swung to a position that will cause both contact points 21 and 20 to be in circuit with the source of current 13. By then operating the switch 15 both the solenoid and the electric light 16 will be in circuit with the source of current 13.

I claim:

1. In a vehicle signal, the combination with a casing, a semaphore mounted within the casing and adapted to have its free end extending outwardly from one side of the casing, electrically operated reciprocating means mounted within the casing and carried by the free end of the semaphore, the opposite end of the semaphore being provided with a link adapted to be connected to the said reciprocating means, a pair of switches connected by an electric circuit to said reciprocating means, one of said switches being provided with double contact points whereby said double pointed switch may be positioned for closing the circuits to the reciprocating means and to the electric light for operating both the reciprocating means, and the light carried by the semaphore.

2. In a vehicle signal, the combination with a casing comprising two independent halves, a semaphore mounted within said casing for pivotal movement, said casing being provided with an opening in one side through which the semaphore extends, a source of current, a solenoid mounted within said casing, said solenoid and said source of current being connected by an electric circuit, a light carried by one end of said semaphore, a link connecting the opposite end of said semaphore with the said solenoid, a pair of switches mounted in the circuit for said solenoid, the light circuit having a terminal contact point positioned adjacent one of said switches, said last mentioned switch being provided with double contact points whereby said double pointed switch may be positioned for closing both circuits when said solenoid circuit is completely closed for operating both the solenoid and the light carried by said semaphore.

3. In a vehicle signal, the combination with a casing said casing comprising independent halves having complementary ears whereby said halves may be bolted together, bolts extending through apertures in said ears, said casing provided with an opening disposed adjacent its top, a pivot bolt disposed within said casing and arranged adjacent said opening, a semaphore pivotally mounted upon said pivot bolt and curved slightly downwardly from said pivot bolt whereby said semaphore may extend outwardly through said opening in the casing and downwardly in close proximity to the outside of said casing when in normal position, a solenoid mounted within the casing and provided with an armature, a link connecting the inner end of said semaphore with the end of said armature, an electric light provided in the end of said semaphore, a source of current, an electric circuit connecting said solenoid with said source of current, the said circuit provided with a pair of switches, one of said switches having double contact points, a light circuit having one terminal disposed adjacent the said double pointed switch whereby, when said signal switch in said solenoid circuit is closed, the said double pointed switch may be swung into position to close both said solenoid circuit and said light circuit simultaneously, or the said solenoid circuit independently of said light circuit.

In testimony whereof I affix my signature in presence of two witnesses.

GEORGE P. WEBSTER.

Witnesses:
 EDWARD W. SEIGL,
 A. J. COVEN.